United States Patent
Karaagac et al.

(10) Patent No.: US 12,375,347 B2
(45) Date of Patent: Jul. 29, 2025

(54) METHOD FOR PROVIDING NETWORK CONFIGURATION

(71) Applicant: ABB Schweiz AG, Baden (CH)

(72) Inventors: Abdulkadir Karaagac, Ladenburg (DE); Rhaban Hark, Weiterstadt (DE); Sten Gruener, Laudenbach (DE); Jens Heuschkel, Weiterstadt (DE)

(73) Assignee: ABB Schweiz AG, Baden (CH)

( * ) Notice: Subject to any disclaimer, the term of this patent is extended or adjusted under 35 U.S.C. 154(b) by 78 days.

(21) Appl. No.: 18/515,707

(22) Filed: Nov. 21, 2023

(65) Prior Publication Data
US 2024/0171458 A1    May 23, 2024

(30) Foreign Application Priority Data

Nov. 21, 2022  (EP) .................................. 22208611

(51) Int. Cl.
*G06F 15/16* (2006.01)
*H04L 41/0813* (2022.01)
(Continued)

(52) U.S. Cl.
CPC ........ *H04L 41/0813* (2013.01); *H04L 41/085* (2013.01); *H04L 41/12* (2013.01); *H04L 67/10* (2013.01); *H04L 67/12* (2013.01)

(58) Field of Classification Search
CPC ... H04L 41/12; H04L 41/085; H04L 41/0813; H04L 67/10; H04L 67/12
(Continued)

(56) References Cited

U.S. PATENT DOCUMENTS

| 7,089,293 B2 * | 8/2006 | Grosner | H04L 69/164 |
| | | | 710/1 |
| 8,019,849 B1 * | 9/2011 | Lopilato | G06F 16/1827 |
| | | | 709/224 |

(Continued)

FOREIGN PATENT DOCUMENTS

WO    WO 2022/006760 A1    1/2022

OTHER PUBLICATIONS

Anonymous, "IEEE Standard for Local and Metropolitan Area Networks—Bridges and Bridged Networks, Amendment 31: Stream Reservation Protocol (SRP) Enhancements and Performance Improvements," *IEEE Standards Association*, 208 pp. (Oct. 29, 2018).

(Continued)

*Primary Examiner* — Moustafa M Meky
(74) *Attorney, Agent, or Firm* — Leydig, Voit & Mayer, Ltd.

(57) ABSTRACT

A method for providing a network configuration for an industrial network includes discovering network topology data by a network configuration agent (NCA); receiving communication intent data from a network device; commissioning and identifying a remote network engine; forwarding the discovered network topology data and the received communication intent data to the remote network engine and requesting by the NCA the remote network engine for calculating network configuration data indicating network configurations; calculating the network configuration data on the provided network topology data and the received communication intent data; providing the calculated network configuration data to the NCA and distributing the calculated network configuration data to the network device, and initiating a network configuration in the industrial network.

13 Claims, 4 Drawing Sheets

(51) Int. Cl.
    *H04L 41/085*    (2022.01)
    *H04L 41/12*     (2022.01)
    *H04L 67/10*     (2022.01)
    *H04L 67/12*     (2022.01)
(58) Field of Classification Search
    USPC ........................................................ 709/220
    See application file for complete search history.

(56) References Cited

U.S. PATENT DOCUMENTS

| | | | | |
|---|---|---|---|---|
| 8,433,783 | B2* | 4/2013 | Jackowski | H04L 47/19 |
| | | | | 370/469 |
| 8,503,330 | B1* | 8/2013 | Choong | H04W 24/02 |
| | | | | 370/254 |
| 8,694,451 | B2* | 4/2014 | Sasagawa | G06N 3/063 |
| | | | | 706/25 |
| 8,949,471 | B2* | 2/2015 | Hall | H04L 47/2466 |
| | | | | 709/250 |
| 9,639,553 | B2* | 5/2017 | Hall | H04L 47/2466 |
| 9,686,356 | B2* | 6/2017 | Raduchel | H04L 65/403 |
| 10,044,507 | B2* | 8/2018 | Raduchel | H04L 63/102 |
| 11,323,548 | B2 | 5/2022 | Entelis | H04L 67/5651 |
| 11,546,448 | B2* | 1/2023 | Entelis | H04L 12/40 |
| 12,205,712 | B2* | 1/2025 | Shelton, IV | G16H 30/40 |
| 2004/0044744 | A1* | 3/2004 | Grosner | G06F 16/183 |
| | | | | 709/217 |
| 2004/0111523 | A1* | 6/2004 | Hall | H04L 41/12 |
| | | | | 709/230 |
| 2005/0240664 | A1* | 10/2005 | Chen | H04L 41/22 |
| | | | | 709/220 |
| 2012/0005141 | A1* | 1/2012 | Sasagawa | G06N 3/063 |
| | | | | 706/15 |
| 2012/0078994 | A1* | 3/2012 | Jackowski | H04L 47/19 |
| | | | | 709/202 |
| 2020/0389469 | A1* | 12/2020 | Litichever | H04L 63/145 |
| 2021/0149352 | A1* | 5/2021 | Cook | G06F 3/0482 |
| 2022/0046114 | A1* | 2/2022 | Entelis | H04L 69/04 |
| 2022/0224777 | A1* | 7/2022 | Entelis | H04L 69/04 |
| 2023/0023083 | A1* | 1/2023 | Shelton, IV | H04L 67/125 |
| 2024/0036537 | A1* | 2/2024 | Gupta | H04L 12/2834 |

OTHER PUBLICATIONS

Arzo et al., "MSN: A Playground Framework for Design and Evaluation of MicroServices-Based sdN Controller," *J. of Network and Systems Management*, 30(19): 31 pp. (Oct. 21, 2021).

Bjorklund, "YANG—A Data Modeling Language for the Network Configuration Protocol (NETCONF)," *Standards Track, Internet Engineering Task Force (IETF)*, 173 pp. (Oct. 2010).

Kobzan et al., "Configuration Solution for TSN-Based Industrial Networks Utilizing SDN and OPC UA," *25th IEEE International Conference on Emerging Technologies and Factory Automation (EFTA), IEEE*, 1: 1629-1636 (Sep. 8, 2020).

Mahnke, "OPC 10000-22: UA Part 22: Base Network Model," *OPC Foundation*, downloaded from the Internet on Nov. 13, 2023, at: https://reference.opcfoundation.org/v104/Core/docs/Part22/, 35 pp. (Oct. 4, 2021).

Sambo et al., "Enabling Delegation of Control Plane Functionalities for Time Sensitive Networks," *IEEE Access*, 9: 136151-136163 (Oct. 11, 2021).

European Patent Office, Extended European Search Report in European Patent Application No. 22208611.8, 12 pp. (May 8, 2023).

* cited by examiner

METHOD FOR PROVIDING NETWORK CONFIGURATION

CROSS-REFERENCE TO RELATED APPLICATIONS

The instant application claims priority to European Patent Application No. 22208611.8, filed Nov. 21, 2022, which is incorporated herein in its entirety by reference.

FIELD OF THE DISCLOSURE

The present disclosure relates to a computer-implemented method for providing a network configuration for an industrial network, to a network configuration agent (NCA), to a remote network engine, and to a system for providing network configurations.

BACKGROUND OF THE INVENTION

The general background of this disclosure is the providing of network configuration data, in particular network configurations.

Today, the use of Time-Sensitive Networking (TSN) is becoming one of the promising connectivity solutions for Automation Systems, as it offers mechanisms for the industry-grade (i.e., time-sensitive, deterministic, redundant) transmission of data over high performance Ethernet networks. This deterministic behavior of TSN Networks is fully relying on fine-grained configuration and management of network components which is specific to every industrial system and network deployment. Currently, a centralized configuration model is one of the main configuration methods defined by TSN which relies on a central software or hardware component in the network which collects information on communication requirements and available network resources, calculates the network configuration and distribute it to each component. The centralized configuration model typically consists of a centralized network controller, CNC, a centralized user configuration, CUC, and user/network Interface, UNI, which identifies communication between the CNC and CUC. This centralized configuration model is becoming the more preferred solution due to suitability to industrial systems because it provides relatively static networks and there is still an ultimate control on the network. This approach typically relies on direct interaction between the network configuration entities, i.e., CUC and CNC for TSN, the network equipment, i.e., TSN Switches, and end stations/end devices to discover network topology, acquire network communication requirements and download the resulting network configuration.

However, for some deployments, having an end-to-end connection or direct interaction between industrial devices and a network configuration engine may not be preferable/suitable. For instance, for simpler deployments, using a centralized configuration model is not the optimal solution, especially considering extra costs, limitations in terms of scalability, flexibility, maintainability, and complexity.

BRIEF SUMMARY OF THE INVENTION

The present disclosure generally describes a more flexible and powerful network configuration mechanisms for industrial networks, in particular, TSN, in view of the prior art. In one aspect of the invention a computer-implemented method for providing a network configuration for an industrial network is presented, comprising: discovering network topology data by a network configuration agent, NCA; receiving by the NCA of communication intent data from at least one network device of the network; when discovering the network topology data and receiving the communication intent data, commissioning and identifying by the NCA a remote network engine; forwarding by the NCA the discovered network topology data and the received communication intent data to the remote network engine and requesting by the NCA the remote network engine for calculating network configuration data indicating network configurations; calculating the network configuration data by the remote network engine based on the provided network topology data and the received communication intent data; providing the calculated network configuration data to the NCA and distributing by the NCA the calculated network configuration data to each one the at least one network device on the network, initiating a network configuration in the industrial network based on the distributed calculated network configuration data.

BRIEF DESCRIPTION OF THE SEVERAL VIEWS OF THE DRAWING(S)

DETAILED DESCRIPTION OF THE INVENTION

The following embodiments are mere examples for the method and the system disclosed herein and shall not be considered limiting.

Figure 1:
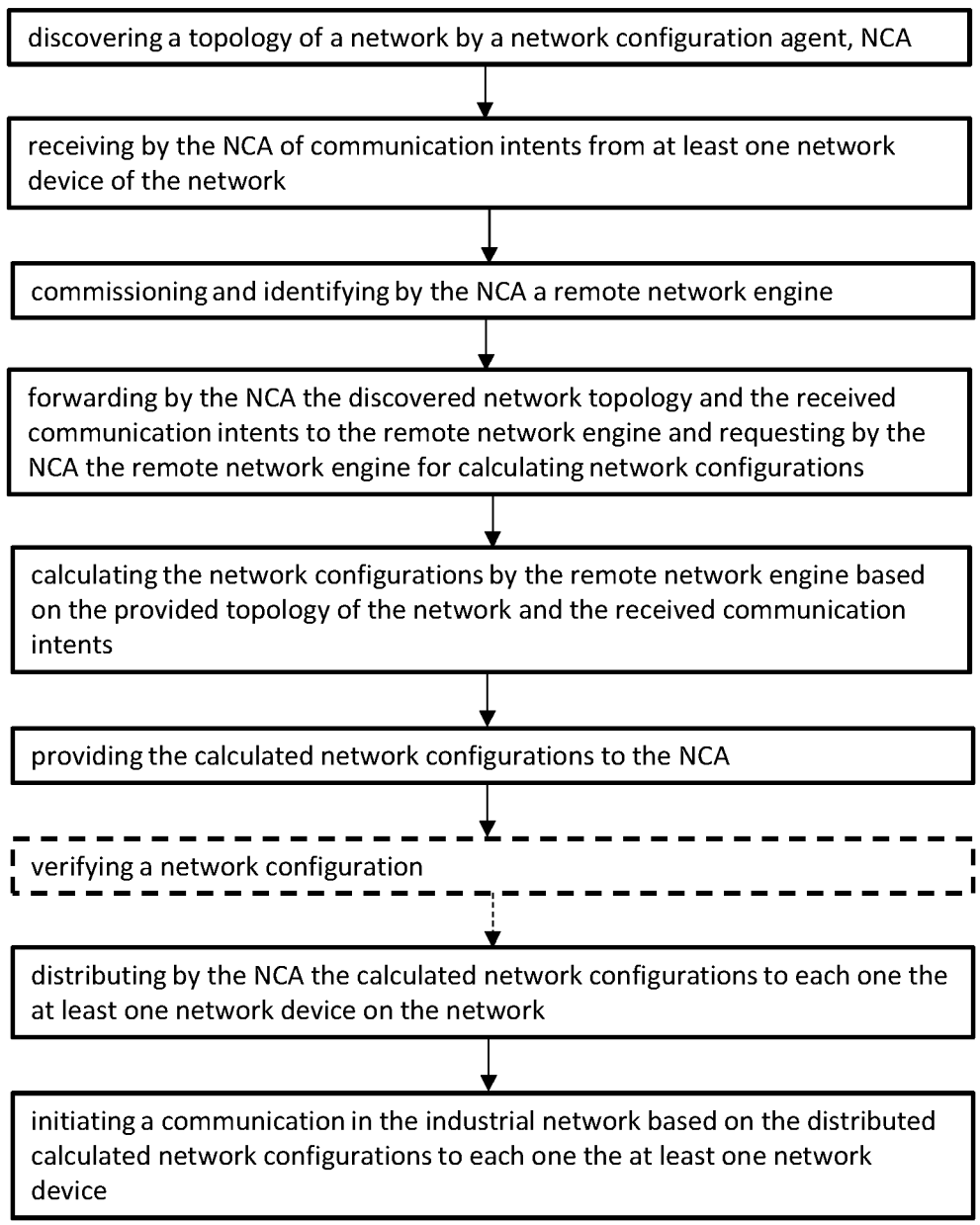
FIG. 1 illustrates a flow diagram of a computer-implemented method for providing a network configuration for an industrial network in accordance with the disclosure.

FIG. 1 illustrates a flow diagram of a computer-implemented method for providing a network configuration for an industrial network. In a first step, network topology data are discovered by a network configuration agent, NCA. In a second step, communication intent data are receiving by the NCA from at least one network device of the network. In a third step, a commissioning and identifying of a remote network engine is provided by the NCA when the network topology data are discovered, and the communication intent data are received. In a fourth step, the discovered network topology data and the received communication intent data are forwarded by the NCA to the remote network engine and the remote network engine is requested by the NCA to calculate network configuration data indicating network configurations. In a fifth step, the network configuration data are calculated by the remote network engine based on the provided network topology data and the received communication intent data. In a sixth step, the calculated network configuration data are provided to the NCA. In sept step, the calculated network configuration data are distributed by the NCA to each one the at least one network device on the network. In an eight step a network configuration in the industrial network is initiated based on the distributed calculated network configuration data.

Optionally, computer-implemented method for providing a network configuration for an industrial network may comprise a further step between the sixth and sept step as described above, i.e. before distinguishing the calculated network configuration data to the at least one network device. His additional step provides a verification of the network configuration data.

Figure 2:
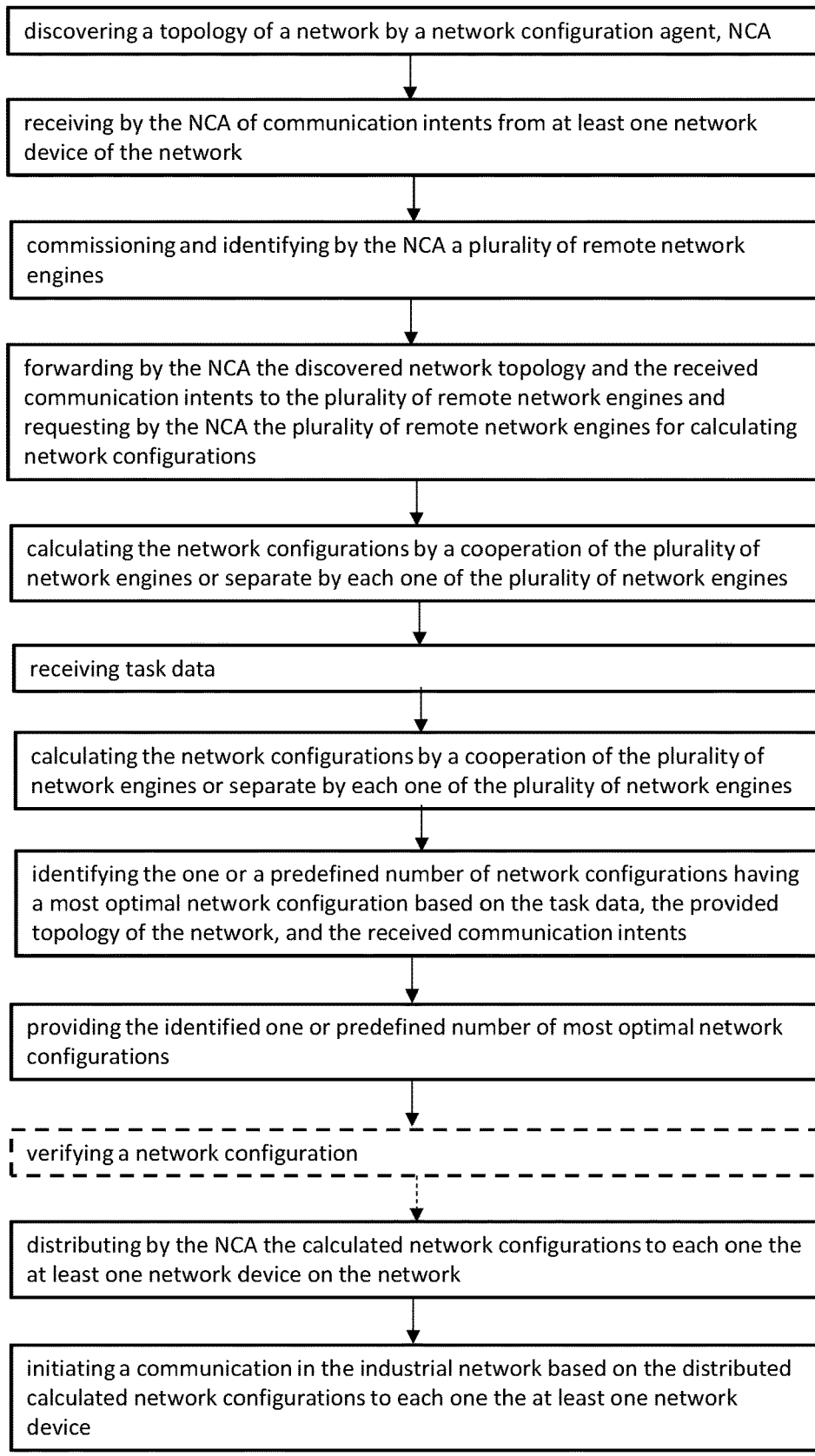
FIG. 2 illustrates a further flow diagram of a computer-implemented method for providing a network configuration for an industrial network in accordance with the disclosure.

FIG. 2 illustrates a further flow diagram of a computer-implemented method for providing a network configuration for an industrial network. Beside the steps one to eight as depicted in FIG. 1, FIG. 2 shows a further embodiment of the computer-implemented method for providing a network configuration for an industrial network at which the calculating comprises the sub steps of calculating the network configuration data by a cooperation of the plurality of network engines or separate by each one of the plurality of network engines, receiving task data, identifying the one or a predefined number of network configuration data having a most optimal network configuration based on the task data, the provided network topology data, and the received communication intent data, and providing the identified one or predefined number of most optimal network configuration data.

Figure 3:
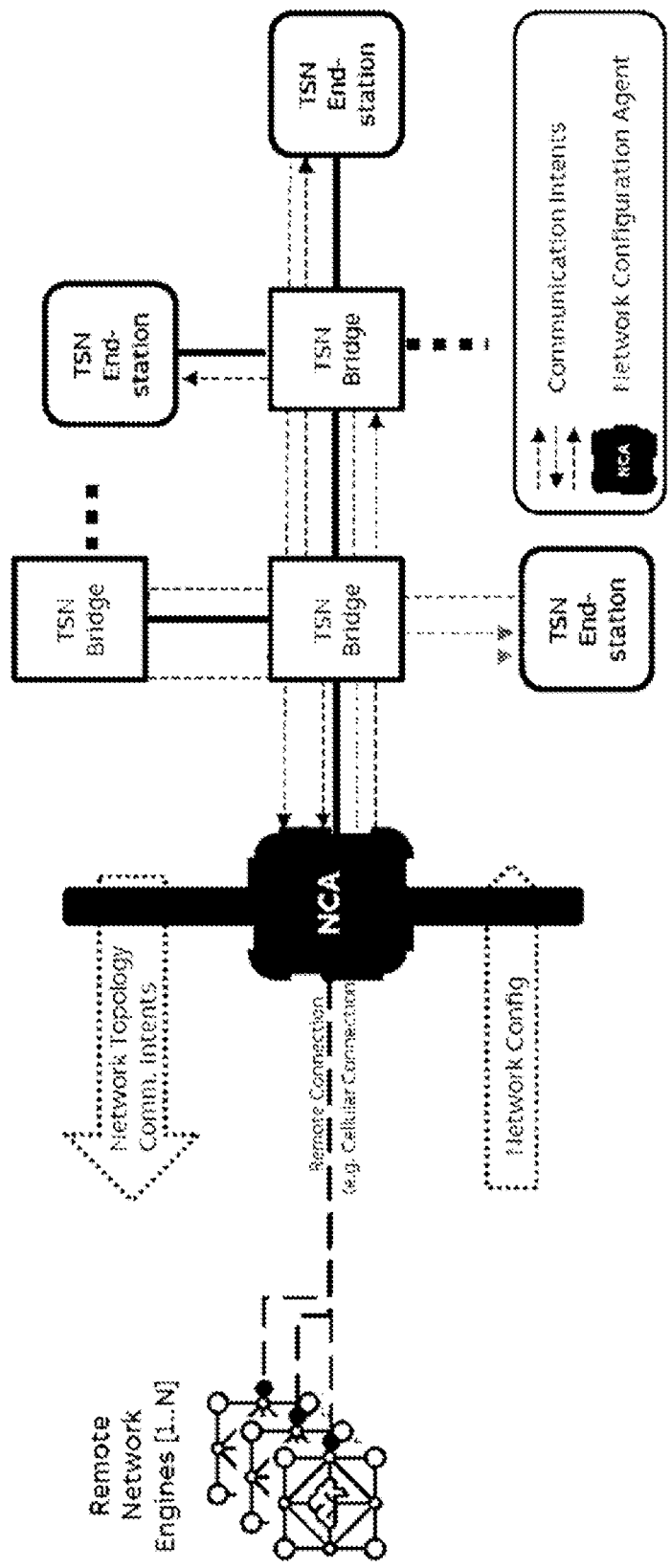
FIG. 3 illustrates an overview over the network configuration agents, NCA, in accordance with the disclosure.

FIG. 3 illustrates an overview over the network configuration agents, NCA. The NCA receives the communication intent data from all network devices being included in the physical network. For instance, the physical network is a TSN network. The network devices and the NCA are communicatively coupled indirectly or directly by wire or wireless. The NCA forwards the network topology data and communication intent data to remote network engines, which are located at a different position than the NCA and the physical network by a remote connection, in particular a cellular connection. The NCA receives network configuration data from the at least one remote network engine and provides these received network configuration data to all network devices being included in the physical network, in particular TSN network. As depicted in FIG. 3, the NCA represents the connection interface between the at least one remote network engine and the network devices of the physical network.

Figure 4:
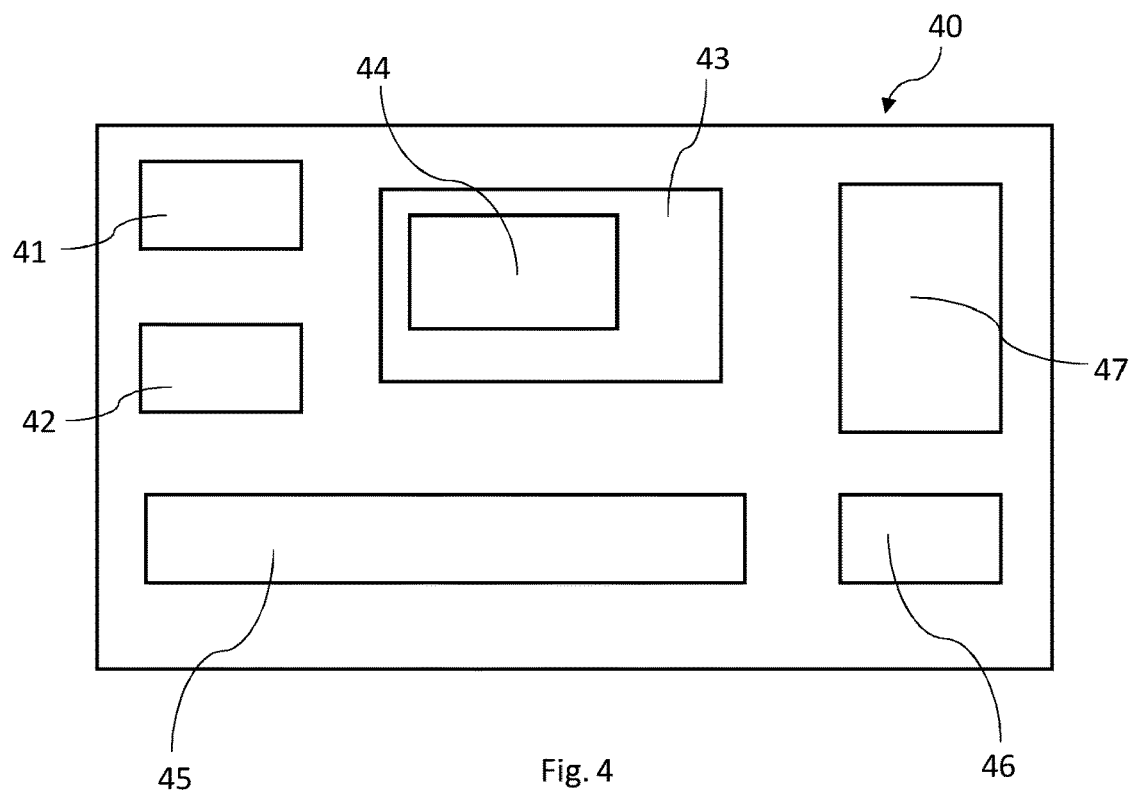
FIG. 4 illustrates an example embodiment of a network configuration agent in accordance with the disclosure.

FIG. 4 illustrates an example embodiment of a network configuration agent, NCA. The network configuration agent, NCA, 40 comprises: a network topology discovering unit 41 for discovering network topology data. Further the network configuration agent 40 comprises a communication receiving unit 42 for receiving communication intent data from at least one network device of the network and a communication unit 43. The communication unit 43 includes a commissioning and identifying unit 44 for commissioning and identifying a network engine, when network topology data are discovered, and the communication intent data are received. The NCA further comprises a transmission unit 45 for forwarding the discovered network topology data and the received communication intent data to the remote network engine, a requesting unit 46 for requesting the remote network engine for calculating network configuration data, and a receiving and distributing unit 47 for receiving the calculated network configuration data from the remote network engine and for distributing the calculated network configuration data to each one of the at least one network device and for initiating a network configuration in the industrial network based on the distributed calculated network configuration data. All units are communicatively coupled by wire or wireless.

Optionally, the NCA comprises verification unit for providing a verification of the network configuration data provided by the remote network engine.

Figure 5:
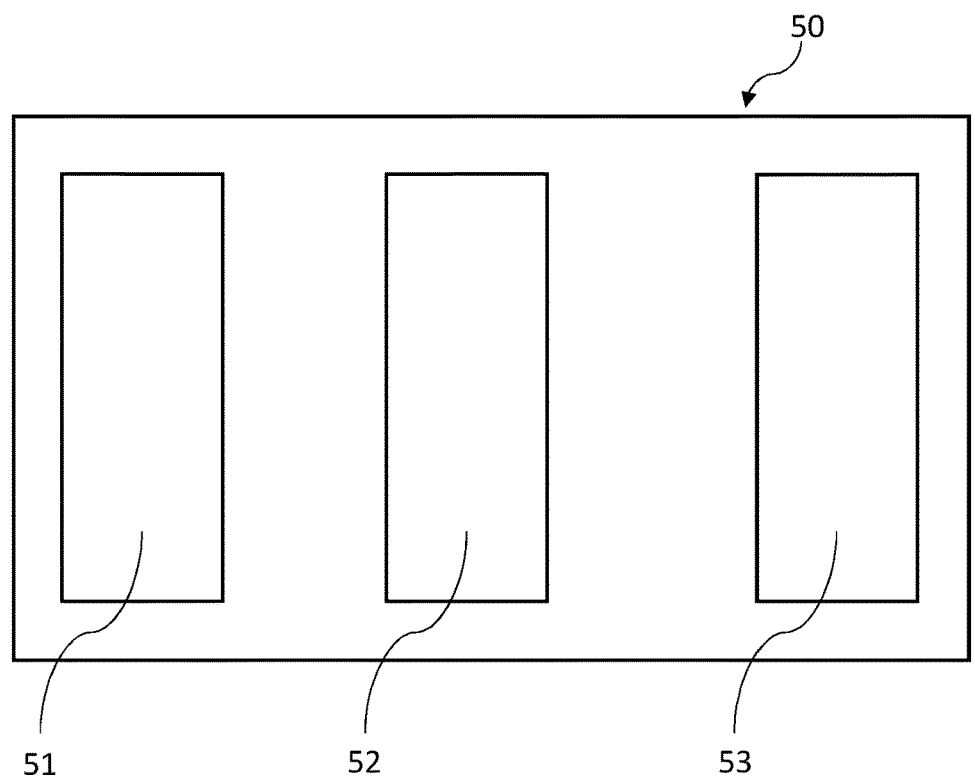
FIG. 5 illustrates an example embodiment of a remote network engine in accordance with the disclosure.

FIG. 5 illustrates an example embodiment of a remote network engine. The remote network engine 50 comprises a receiving unit 51 for receiving discovered network topology data and received communication intent data from the NCA 40 and for receiving requests for calculating network configuration data from the NCA 40, a network configuration calculation unit 52 for calculating, receiving and/or querying at least one network configuration data, and a transmitting unit 53 for providing the calculated network configuration data to the NCA 40.

The present disclosure has been described in conjunction with a preferred embodiment as examples as well. However, other variations can be understood and effected by those persons skilled in the art and practicing the claimed invention, from the studies of the drawings, this disclosure, and the claims. Notably, in particular, the any steps presented can be performed in any order, i.e., the present invention is not limited to a specific order of these steps. Moreover, it is also not required that the different steps are performed at a certain place or at one node of a distributed system, i.e., each of the steps may be performed at a different node using different equipment/data processing units.

In the claims as well as in the description the word "comprising" does not exclude other elements or steps and the indefinite article "a" or "a" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The term network configuration data as used herein is to be understood broadly and represents any data indicating, providing, applying and/or implementing the network configuration in a network, in particular a physical network. The network configuration may be any process for setting a network's controls, flow and operation to support and/or provide a network communication of an organization and/or network owner and/or to provide a communication within the network but is not limited thereto. This term also incorporates multiple configuration and setup processes on network hardware, software and other supporting devices and components. For instance, the network configuration may be data scheduling, planning, implementing a communication/data exchange in the physical network and/or evaluating with optimizing and implementing an optimized communication/data exchange in the physical network.

The term data as used herein is to be understood broadly in the present case and represents any kind of data. Data may be single numbers/numerical values, a plurality of a numbers/numerical values, a plurality of a numbers/numerical values being arranged within a list, an integer, and a string, but are not limited thereto.

The term industrial network as used herein is to be understood broadly and represents any network, in particular computer network or physical network, being used and/or provided within an industrial area, a domain, a factory, or a plant. Within the industrial network a plurality of network components/network devices are provided which are connected to each other in a direct or indirect communicative manner. The communication can be provided by wire or wireless.

The term discovering as used herein is to be understood broadly and represents any method for providing, receiving and/or querying network topology data. The discovering of the topology of a network may be based on the standardized link layer discovery protocol (LLDP) but is not limited thereto. For instance, the discovering is provided by executing an identification process identifying one, at least one, or all network devices in the network. In a typical network discovery process, LLDP-enabled devices start sending advertisements about themselves while they receive and record information about their neighbors. This allows devices in a network to learn about all devices to which they are connected. After this step, NCA can start fetching the LLDP neighbor information from the network devices by means of network management protocols, e.g., NETCONF. This will allow NCA to discover network devices and topology gradually: starting from one point in the network with a blank picture of the network, walking through the newly discovered devices in the network and collecting neighbor information recursively, and finally complete the network topology by bringing all these neighbor data.

The term network topology data as used herein is to be understood broadly and represents any data indicating/presenting the topology of a network, i.e., the physical and logical relationship of nodes respectively components/devices in a network, the schematic arrangement of the links and nodes, or some hybrid combination thereof. The topology of the network data may be provided in the form of a standardized data model, preferably based on YANG.

The term network configuration agent, NCA, as used herein is to be understood broadly and represents any end-device of a network which interacts with a remote network engine over a remote connection or the internet and proxies the network configuration providing services to the connected network and network devices from wherever and whenever needed. In other words, the network configuration agent is an interface between the network configuration providing services/devices and the network. For instance, the NCA can be a TSN-enabled industrial equipment like drives or edge gateways which has a main functionality in the industrial system but also performs required configuration forwarding operations received via another network connection like a cellular connection in drives from external networks or the Internet but is not limited thereto. Alternatively, a NCA can also be a very simple end-device which is dedicated to achieving network configuration data in new network deployments, but not offering any network intelligence. Additionally, the NCA can also store received network configuration data for different network devices, if sufficient storage is available, and redistribute it in the future. The storing of received network configuration data leads to the useful case that network configurations of network equipment's or end-devices which lose the previously provided network configuration due to a network/device reset or device replacement don't have to be calculated and/or provided again. Additionally, or alternatively, the NCA may include an anonymization process/method providing the anonymization of network equipment's and end-devices by changing their unique and assigned addresses, i.e., MAC, IP, with other addresses or identifiers, in order to address privacy or security concerns about sharing device information with remote network engines.

The term receiving as used herein is to be understood broadly and represents any method/way for receiving or get provided with communication intent data. Exemplary, the receiving may be provided by using standardized protocols and automated methods like the Link Layer Discovery Protocol, LLDP, or the Network Configuration Protocol, NETCONF, but is not limited thereto. Alternatively, the network devices of the network can also publish, provide, transmit, or broadcast their communication intents data, wherein these data were received by the NCA.

The term communication intent data as used herein is to be understood broadly and represents any data indicating the communication intent. The communication intent may include information about which network device is receiving, needing and/or providing what data with which networking behavior (e.g., frequency, size etc.) and connectivity requirements (e.g., latency, reliability, jitter) and also include information about the connectivity of each one of the at least one network device. For instance, the communication intent data may comprise the requests for TSN flow establishment and corresponding quality of service requirements.

The term commissioning and identifying as used herein is to be understood broadly and represents any process or method for selecting, identifying, choosing, checking, and/or authenticating remote network engine. The commissioning and identifying is executed by the NCA. For instance, commissioning and identifying can be provided by an IP address, ZRL, credentials and/or certificates, but is not limited thereto. The commissioning and identifying process respectively step starts when the network topology data and the communication intent data are received.

The term remote network engine as used herein is to be understood broadly and represents any engine, being capable for providing, and calculating and/or querying network configuration data. The network engine is the remote network engine because it is connected to the NCA via a remote connection or the Internet. Hence, the remote network engine and the NCA are located at different locations, in particular spatial locations, i.e., the network engine is not arranged within the network and the NCA is arranged in the network. Therefore, both the remote network engine and the NCA are not located within the same network and/or network environment. For instance, the network engine is an engine being located in the cloud or at a first company and the NCA is located at a second company, wherein the network engine and the NCA are communicatively coupled via a remote connection from whenever and wherever needed. However, in this context, the term different location does not represent, describe, and define that the NCA and the remote network engine are located/arranged within the same network and/or network environment. Alternatively, one or more remote network engines and a number of NCAs can be owned by the same company and even located in the same site but connected to each other over a different network technology like cellular 5G, which will allow the remote configuration of several network segments from one or more local remote network engines.

The term forwarding as used herein is to be understood broadly and represents any process or method for transmitting the discovered network topology data and the received communication intent data to the remote network engine. The forwarding may include that the remote network engine receives and/or queries the discovered network topology data and the received communication intent data from the NCA, that the NCA transmits, sends and/or provides the discovered network topology data and the received communication intent data to the remote network engine. The forwarding can be provided by the transmission and/or receiving unit being respectively comprised in the remote network engine and/or the NCA. The forwarding may be provided by wire or wireless.

The term calculating as used herein is to be understood broadly and represents any process or method for providing network configuration data. The calculation is executed by the remote network engines. The calculation may include a determination, a providing, and/or the calculating of the network configuration data based on the provided network topology data and the received communication intent data. For instance, for the redundancy management, the network engine needs to determine all possible paths in the provided network topology between a source and destination, select a number (based on the redundancy requirements provided in intent definition) of disjoint paths which offers best redundancy, determine the frame replication and elimination points, and generate configuration for those devices to perform required actions to replicate or drop certain packets from particular streams. Similarly, the network engines should also provide low latency scheduling and traffic shaping, with guaranteed packet transfers, algorithms to meet bounded latency, throughput and reliability guarantees defined in the intent definition. The network configuration data can be provided by a cooperation of the plurality of network engines or separate of each one of the pluralities of network engines.

The term requesting as used herein is to be understood broadly and represents any process or method for order, authorize and/or instruct the remote network engine with calculating the network configuration data. The requesting is executed by the NCA via a predefined interface like REST API, which allows remote network engines to interact with NCA to perform all the above-listed management and monitoring operations.

The term initiating as used herein is to be understood broadly and represents a process or method for providing, starting, triggering, producing, operating, causing and/or activating a network configuration in the industrial network based on the distributed calculated network configuration data. The initiating is provided by distributing, i.e., sending and/or transmitting, the calculated network configuration data to each one of the at least one network device, wherein each one of the at least one network device implements, executes and/or realizes the network configuration included in the provided distributed network configuration data. Each one of the at least one network device can be provided with and implements, executes and/or realizes the whole distributed network configuration data or solely a part of the distributed network configuration data. In other words, each network device may receive their specific configuration, wherein communication requirements of every application respectively network device is met by the network. The distribution by the NCA of the network configuration data may be provided by means of a network management protocol like NETCONF, RESTCONF or SNMP, but is not limited thereto.

The use of NCA and the locating of the remote network engines at a different location than the NCA enables an easy providing of network configuration data for networks and network devices in a physical network without any need of a dedicated network management entity, i.e., CNC and CUC of centralized configuration model, in that particular network. Further, the use of NCA and the locating of the remote network engines at a different location than the NCA enables that network configuration data for several different physical networks can be provided with minimal effort and complexity for network management and planning. Hence, the deployment and commissioning of industrial networks by removing the need of any extra component for network resource management/planning can be facilitated, such that the adoption speed for emerging networking technologies can be increased. Further, the use of a NCA as the only entry point for network configuration into network enables to achieve network configuration from network engines in a more secure manner without having any direct access to the actual network or network devices. Further, the NCA can be easily reconfigured to use another remote network engine such that a flexibility to choose and a change of the vendor and tool for network configuration afterwards can be easily provided. Furthermore, the use of the NCA enables to connect and request network configuration data from multiple remote network engines from different locations and/or vendors, which brings opportunity to combine different network configuration capabilities and/or select the most suitable/optimal configuration from the ones provided by different remote network engines with different capabilities. By using of the locating of the remote network engines at a different location than the NCA, in particular the separation of the NCA and the remote network engine, enables that in case of an update only the NCA or the remote network engine has to be updated and not the whole network.

In an embodiment of the method for providing a network configuration for an industrial network, the method comprises the step of, before distinguishing the calculated network configuration data to the at least one network device, verifying the network configuration data.

The term verifying as used herein is to be understood broadly and represents any correlation, checking and/or proving process capable to verify the quality of the calculated network configuration data and therefore the calculated network configuration. In case, the results of the verification process may be below a pre-defined, pre-set, pre-determined or pre-provided threshold, initializing the computer-implemented method for providing a network configuration for an industrial network to execute the method steps again, until the results of the verification process are above the threshold. The pre-defined, pre-set, pre-determined or pre-provided threshold can be provided by a user, but is not limited thereto.

By verifying the calculated network configuration data, it can be insured that only correct and proper network configuration data including network configurations are provided by the NCA and are distributed by the NCA to each one of the at least one network devices in the network for initiating a network configuration in the network.

In an embodiment of the method for providing a network configuration for an industrial network, the network is a time sensitive network, TSN.

In an embodiment of the method for providing a network configuration for an industrial network, the NCA is a network end-device.

In an embodiment of the method for providing a network configuration for an industrial network, wherein the providing of the calculated network configuration data from the remote network engine to the NCA is provided as a standardized data model.

The term standardized data model as used herein is to be understood broadly and represents any model being capable for providing respectively returning the calculated network configuration data to the NCA. For instance, standardized data model may be YANG or Management Information Base (MIB) modules or OPC UA information model for base network model but is not limited thereto.

By using the standardized data model, the reliable providing of the calculated network data from the remote network engines to the NCA can be provided.

In an embodiment of the method for providing a network configuration for an industrial network, the distributing by the NCA of the calculated network configuration data to the at least one network device is provided by a network management protocol.

The term network management protocol as used herein is to be understood broadly and represents any protocol being capable for distributing by the NCA the calculated network configuration data to the at least one network device provided in the network. For instance, the network management protocol may be NETCONF or RESTCONF or Simple Network Management Protocol, SNMP.

By using the network management protocol, a reliable distribution of the calculated network configuration data to the at least one network device for the network can be provided.

In an embodiment of the method for providing a network configuration for an industrial network, the calculating of the network configuration data by the remote network engine comprises receiving and/or querying network configuration data from a database, wherein the receive and/or the query is based on the provided network topology data and the received communication intent data.

The term database as used herein is to be understood broadly and represents any memory, storage unit, storage device, cloud storage, and/or cache, but is not limited thereto, on which the network configuration data are stored. The remote network engine is able to receive and/or query the network configuration data from the database.

By receiving and/or querying the network configuration data from a database, the calculation time, in particular the providing time, of the network configuration data can be significantly decreased and the whole computer-implemented method can be made faster. Storing of network configuration data also enables a back-upping or pausing of the network configuration processes.

In an embodiment of the method for providing a network configuration for an industrial network, when the discovered network topology data and the received communication intent data are forwarded to a plurality of remote network engines and the plurality of remote network engines are requested by the NCA for calculating network configuration data, the calculating comprises: calculating the network configuration data by a cooperation of the plurality of network engines or separate by each one of the plurality of network engines, receiving task data; identifying the one or a predefined number of network configuration data having a most optimal network configuration based on the task data, the provided network topology data, and the received communication intent data; and providing the identified one or predefined number of most optimal network configuration data.

The term task data as used herein is to be understood broadly and represents any data indicating respectively identifying the one or a predefined number of network configuration data having a most optimal network configuration. The most optimal network configuration may be pre-formed, pre-provided, pre-determined, pre-processed or pre-set by the user, but is not limited thereto.

By the identification of one or a predefined number of network configuration data having a most optimal network configuration, it can be insured that only network configuration data including the most optimal network configurations may be provided through the NCA and distributed by the NCA to each one of the at least one network devices in the network.

In a further aspect a network configuration agent, NCA, is presented, comprising: a network topology discovering unit for discovering network topology data; a communication receiving unit for receiving communication intent data from at least one network device of the network; a communication unit including: a commissioning and identifying unit for commissioning and identifying a network engine when network topology data are discovered and the communication intent data are received, a transmission unit for forwarding the discovered network topology data and the received communication intent data to the remote network engine; a requesting unit for requesting the remote network engine for calculating network configuration data; and a receiving and distributing unit for receiving the calculated network configuration data from the remote network engine and for distributing the calculated network configuration data to each one of the at least one network device and for initiating a network configuration in the industrial network based on the distributed calculated network configuration data.

In a further aspect a remote network engine is presented, comprising: a receiving unit for receiving discovered network topology data and received communication intent data from a NCA and for receiving requests for calculating network configuration data from the NCA; a network configuration calculation unit for calculating, receiving and/or querying at least one network configuration data; a transmitting unit for providing the calculated network configuration data to the NCA.

In an embodiment of the remote network engine, the network configuration calculation unit comprises a determination unit including algorithms for providing time-sensitive resource scheduling, deterministic performance evaluation, a querying unit for querying the network configuration data from a database and/or a receiving unit for receiving the network configuration data from a database.

In a further aspect a system for providing network configurations is presented, comprising: the network configuration agent, NCA, as described above; a network; and the remote network engine as described above.

In an embodiment of the system for providing network configurations, the NCA is located at a different location than the remote network engine.

In a further aspect a computer program element with instructions is presented, which, when executed on computing devices of a computing environment, is configured to carry out the steps of the method as described above in a system as described above.

In a further aspect a computer-readable storage medium comprising instructions is presented which, when executed by a computer, cause the computer to carry out the method as described above.

Any disclosure and embodiments described herein relate to the method, the network configuration agent, the remote network engine, and the system, lined out above and vice versa. Advantageously, the benefits provided by any of the embodiments and examples equally apply to all other embodiments and examples and vice versa.

As used herein "determining" also includes "initiating or causing to determine", "generating" also includes "initiating or causing to generate" and "providing" also includes "initiating or causing to determine, generate, select, send or receive." "Initiating or causing to perform an action" includes any processing signal that triggers a computing device to perform the respective action.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising." "having." "including." and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for providing a network configuration for an industrial network, comprising:
    discovering network topology data by a network configuration agent (NCA);
    receiving by the NCA of communication intent data from at least one network device of the network;
    when discovering the network topology data and receiving the communication intent data,
    commissioning and identifying by the NCA a remote network engine;
    forwarding by the NCA the discovered network topology data and the received communication intent data to the remote network engine and requesting by the NCA the remote network engine for calculating network configuration data indicating network configurations;
    calculating the network configuration data by the remote network engine based on the provided network topology data and the received communication intent data;
    providing the calculated network configuration data to the NCA and distributing by the NCA the calculated network configuration data to each one the at least one network device on the network, and
    initiating a network configuration in the industrial network based on the distributed calculated network configuration data.

2. The computer-implemented method according to claim 1, further comprising verifying the network configuration data before distinguishing the calculated network configuration data to the at least one network device.

3. The computer-implemented method according to claim 1, wherein the network is a time sensitive network, TSN.

4. The computer-implemented method according to claim 1, wherein the NCA is a network end-device.

5. The computer-implemented method according to claim 1, wherein the providing of the calculated network configuration data from the remote network engine to the NCA is provided as a standardized data model.

6. The computer-implemented method according to claim 1, wherein the distributing by the NCA of the calculated network configuration data to the at least one network device is provided by a network management protocol.

7. The computer-implemented method according to claim 1, wherein the calculating of the network configuration data by the remote network engine, comprises receiving and/or querying network configuration data from a database, wherein the receive and/or the query is based on the provided network topology data and the received communication intent data.

8. The computer-implemented method according to claim 1, wherein, when the discovered network topology data and the received communication intent data are forwarded to a plurality of remote network engines and the plurality of remote network engines are requested by the NCA for calculating network configuration data, the calculating comprising:
    calculating the network configuration data by a cooperation of the plurality of network engines or separate by each one of the plurality of network engines,
    receiving task data;
    identifying the one or a predefined number of network configuration data having a most optimal network configuration based on the task data, the provided network topology data, and the received communication intent data; and
    providing the identified one or predefined number of most optimal network configuration data.

9. A network configuration agent (NCA), comprising:
    a network topology discovering unit for discovering network topology data;
    a communication receiving unit for receiving communication intent data from at least one network device of the network;
    a communication unit including:
        a commissioning and identifying unit for commissioning and identifying a network engine when network topology data are discovered and the communication intent data are received,
        a transmission unit for forwarding the discovered network topology data and the received communication intent data to the remote network engine;
        a requesting unit for requesting the remote network engine for calculating network configuration data; and
        a receiving and distributing unit for receiving the calculated network configuration data from the remote network engine and for distributing the calculated network configuration data to each one of the at least one network device and for initiating a network configuration in the industrial network based on the distributed calculated network configuration data.

10. A remote network engine, comprising:
a receiving unit for receiving discovered network topology data and received communication intent data from a NCA and for receiving requests for calculating network configuration data from the NCA;
a network configuration calculation unit for calculating, receiving and/or querying at least one network configuration data;
a transmitting unit for providing the calculated network configuration data to the NCA.

11. The remote network engine according to claim 10, wherein the network configuration calculation unit comprises a determination unit including algorithms for providing time-sensitive resource scheduling, deterministic performance evaluation, a querying unit for querying the network configuration data from a database and/or a receiving unit for receiving the network configuration data from a database.

12. The remote network engine of claim 10, wherein the remote network engine is part of a system for providing network configurations, the system comprising a network configuration agent (NCA), and a network.

13. The remote network engine according to claim 12, wherein the NCA is located at a different location than the remote network engine.

* * * * *